H. G. DREYER.
THIEF CHECK FOR AUTOMOBILES.
APPLICATION FILED FEB. 18, 1921.
1,431,515.
Patented Oct. 10, 1922.
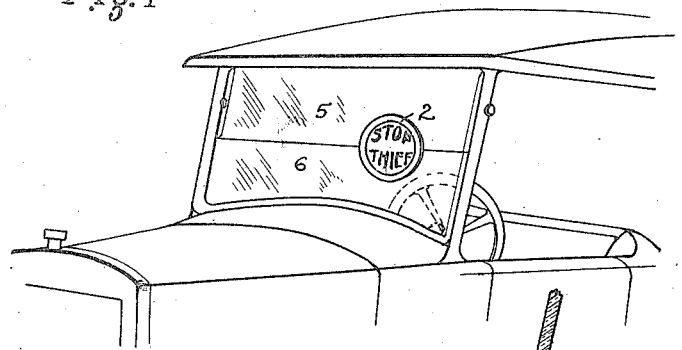
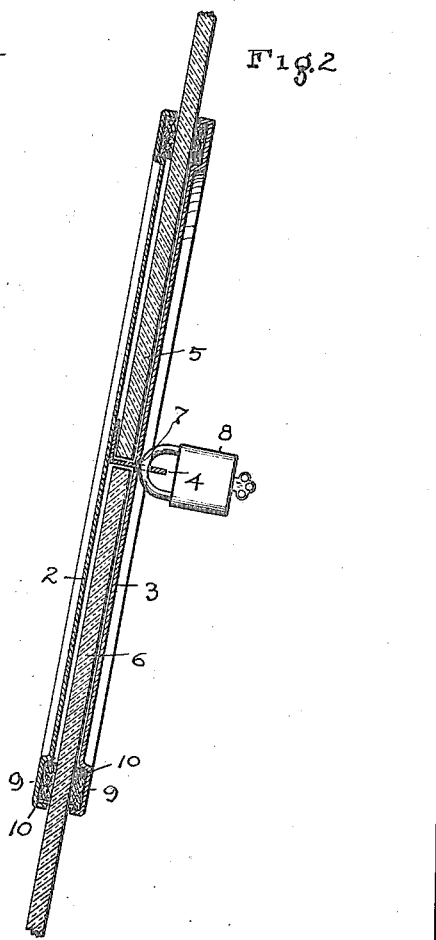
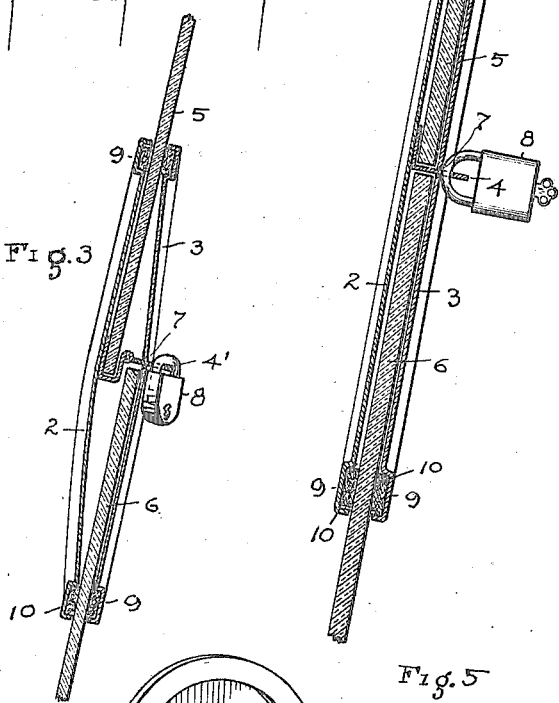
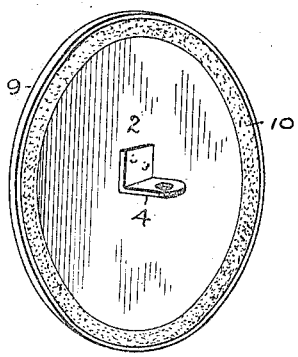
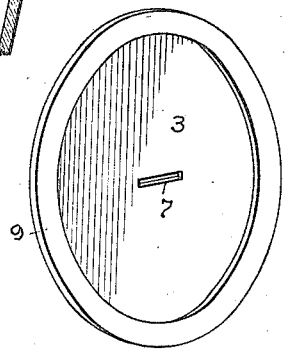
Inventor
Henry G Dreyer
By Fisher   
Attorneys Patented Oct. 10, 1922.

1,431,515

UNITED STATES PATENT OFFICE.

HENRY G. DREYER, OF CLEVELAND, OHIO.

THIEF CHECK FOR AUTOMOBILES.

Application filed February 18, 1921. Serial No. 446,039.

*To all whom it may concern:*

Be it known that I, HENRY G. DREYER, a citizen of the United States, residing at Cleveland, in the county of Cuyahoga and State of Ohio, have invented certain new and useful Improvements in a Thief Check for Automobiles, of which the following is a specification.

My general object is to provide a thief check, or device adapted to thwart or prevent the theft of automobiles and to aid the authorities in apprehending and arresting an automobile thief. As shown herein the invention is especially constructed to be attached to the glass wind-shield of an automobile where it will be prominently displayed and can only be removed by the owner or authorized person operating the car.

In the accompanying drawing, Fig. 1 is a perspective view of the front end of an automobile showing my invention mounted on the wind-shield. Fig. 2 is a sectional view of the glass sections comprising a wind-shield, showing my invention in locking connection with said sections. Fig. 3 is a sectional view of the invention adapted to overlapping sections. Figs. 4 and 5 are rear perspective views of the front and rear disks, respectively.

The invention comprises two metal plates or disks 2 and 3 respectively, plate 2 having a perforated projection 4 at its center which is thin enough to be projected between the two panes or sections of glass 5 and 6, respectively, of the wind-shield of an automobile. Disk or plate 3 is provided with a central slot 7 through which perforated projection 4 is adapted to extend, and a pad-lock 8 may be used to secure these parts irremovably upon the wind-shield. Only an authorized person having the proper key can separate the plates and remove them from the wind-shield, and any attempt to bend or distort the plates or their locking parts will shatter and break the sections of glass.

Each plate is preferably provided with a channeled rim or bead 9, within which a felt or resilient ring or washer 10 may be confined to protect the glass and prevent noise and rattle, and this bead reenforces the disk and has such thickness that bending of the disks becomes difficult and so that a bent disk can not be slipped through the gap between the two glass sections.

In some types of wind-shields the panes of glass overlap and for that type I bend the projection 4 outwardly and then upwardly parallel with the plane face of the display disk, and employ a hinged part or hasp 4' to extend through the rear disk where its perforated end may be engaged by the padlock. In fact, the same form of projection and hasp may be used with wind-shields of the type shown in Fig. 2.

It is common practice in all large cities for automobile owners to park their machines on the streets and in public places for long periods of time and where permissible for the entire day. My idea is to lock a display plate or disk upon the glass wind-shield where it will occupy such a prominent place that anyone driving the machine in the public streets would immediately attract the attention of the public and especially policemen and traffic officers. This display plate may bear a simple colored symbol approved by the proper authorities, or suitable words may be used to indicate the purpose of the device, such as "Parked; Stop thief. Thief check; Stolen", etc. The central portion of the front disk may be illuminated or coated with illuminating paint, and the letters may be printed, raised, indented, or open. The preferred place of attachment of the plates is at the meeting line of the glass sections and at a point immediately in front of the steering wheel, but the plates can also be attached between the movable section and the fixed frame of the wind-shield.

As shown herein the projecting part 7 is an angular element spot welded or riveted to front plate 2, although said projection may be an integral part of plate 2 struck up rearwardly from the plane face thereof. Plate 2 is also shown as of the same diameter as the plate 3, but plate 2 may be a relatively small metal disk with a rearwardly-extending perforated projection, whereby locking of the rear plate may be effected with the panes of glass in the same manner as herein shown, and in that event the symbols or display characters will appear on the front face of the inside plate and be seen through the transparent sections.

What I claim is:

1. A thief-check for automobiles, comprising a display plate and a clamping member adapted to be engaged with the opposite sides of the wind-shield, a connecting member carried by one of said members and adapted to extend through said windshield, and a lock and key adapted to secure the said parts together.

2. A thief check for automobiles, comprising a pair of plates engageable with opposite sides of a windshield one of said plates having a connecting member secured thereto, adapted to extend through said windshield the other of said plates having an aperture to receive said connecting member; and a key controlled lock engaging said connecting member.

3. A thief check for automobiles, comprising an outer flexible plate having a marginal cushioning strip secured thereto and a connecting member adapted to pass between the upper and lower plates of the windshields, said plate having a character or symbol thereon; an inner flexible clamping plate having a marginal cushioning strip engageable with the inside of the shield and an aperture to receive said connecting member; and a key controlled lock engaging said connecting member within said clamping plate.

4. A thief check for automobiles, comprising an outer flexible plate having a channel clip secured to the back thereof adapted to receive the lower edge of the upper pane of the windshield, a connecting member pivoted to said clip; an inner flexible clamping plate having an aperture adapted to receive said connecting member; and a key controlled lock engaging said connecting member within said inner plate.

Signed at Cleveland, in the county of Cuyahoga, and State of Ohio, this 11th day of February, 1921.

HENRY G. DREYER.